United States Patent [19]

Hagiwara et al.

[11] Patent Number: 5,372,419
[45] Date of Patent: Dec. 13, 1994

[54] INTERNAL MIXER HAVING TWO SPEED GEARING

[75] Inventors: Katsunobu Hagiwara; Tsuyoshi Miyoshi, both of Kobe, Japan

[73] Assignee: Kabushiki Kaisha Kobe Seiko Sho, Kobe, Japan

[21] Appl. No.: 238,331

[22] Filed: May 4, 1994

Related U.S. Application Data

[63] Continuation of Ser. No. 941,196, Sep. 4, 1992, abandoned.

[30] Foreign Application Priority Data

Sep. 6, 1991 [JP] Japan .................... 3-255709

[51] Int. Cl.⁵ .................................. B29B 7/22
[52] U.S. Cl. ........................... 366/100; 74/333; 74/665 GA
[58] Field of Search ............... 425/204, 209; 366/69, 366/76, 79, 83–85, 96–97, 100, 318; 74/331, 333, 342, 665 F, 665 GA, 665 G, 343

[56] References Cited

U.S. PATENT DOCUMENTS

| | | | |
|---|---|---|---|
| 1,585,725 | 5/1926 | Lauterbur | 366/69 X |
| 2,698,962 | 1/1955 | Swallow | 425/204 X |
| 2,820,618 | 1/1958 | Bolling . | |
| 3,702,691 | 11/1972 | Fritsch | 366/100 X |
| 3,894,725 | 7/1975 | Schafer | 74/665 GA X |
| 4,261,225 | 4/1981 | Zahradnik | 74/413 X |
| 4,269,085 | 5/1981 | Anders et al. | 74/665 GA |
| 4,297,917 | 11/1981 | Bauer et al. | 74/665 G |
| 4,315,440 | 2/1982 | Chszaniecki | 74/665 G |
| 4,586,219 | 5/1986 | Blach et al. | 74/665 F X |
| 4,586,402 | 5/1986 | Schafer | 74/665 GA X |
| 4,679,461 | 7/1987 | Mizuguchi et al. | 74/665 GA |
| 4,744,668 | 5/1988 | Nortey | 366/76 |
| 4,893,936 | 1/1990 | Borzenski et al. | 366/76 |
| 4,899,620 | 2/1990 | Schiffer | 74/665 GA X |
| 5,092,189 | 3/1992 | Bonalumi | 74/665 GA X |

FOREIGN PATENT DOCUMENTS

| | | | |
|---|---|---|---|
| 3325782 | 11/1984 | Germany | 366/83 |
| 2084035 | 4/1982 | United Kingdom . | |

*Primary Examiner*—David A. Scherbel
*Assistant Examiner*—Charles Cooley
*Attorney, Agent, or Firm*—Oblon, Spivak, McClelland, Maier & Neustadt

[57] ABSTRACT

An internal mixer has two rotors operated at either the same speed or different speeds. In two communicating cylindrical closed spaces which are round in cross section, two rotors connected with two output shafts of a speed reducer are juxtaposed in a non-engaged state, to transmit the driving power from the prime mover to the speed reducer, thus turning the two rotors in opposite directions. In this internal mixer, the two rotors are usable both at the same speed and at different speeds because of the use of the speed reducer having two output shafts whose speed of revolution is changeable between the same speed and different speeds. In one embodiment, the speeds of revolution of the output shafts are changed by a slidable clutch and in another embodiment, the speeds of revolution are changed by a movable stepped gear.

3 Claims, 4 Drawing Sheets

INTERNAL MIXER HAVING TWO SPEED GEARING

This application is a continuation of application Ser. No. 07/941,196, filed on Sep. 4, 1992, now abandoned.

BACKGROUND OF THE INVENTION

1. Field of the Invention

The present invention relates to an internal mixer for mixing rubber, plastics, etc. with various kinds of additives, and more particularly to an internal mixer having two rotors which can be operated both at the same speed and at different speeds.

2. Description of the Prior Art

This type of internal mixer in conventional use is shown in FIGS. 3 and 4.

In the internal mixer shown in FIGS. 3 and 4 (a drawing taken along the arrow A in FIG. 3), a mixing chamber 33, together with a floating weight 31 and a drop door 32, forms communicating cylindrical closed spaces which are round in cross section; within this mixing chamber 33 are juxtaposed two rotors 38 and 39, in a non-engaged condition, which are connected with two output shafts 35 and 36 of a speed reducer 34 through a coupling 37. As a means for driving the rotors, driving power from a prime mover 40 such as a motor is transmitted to an input shaft 41 of the speed reducer 34 through a coupling 42, thus turning these two rotors 38 and 39 in opposite directions of rotation. The rotors 38 and 39 are provided with long blades 38a and 39a and short blades 38b and 39b, that is, with two blades each. These blades 38a, 38b, 39a and 39b spirally extend around the shafts of the rotors 38 and 39; these long blades 38a and 39a are curved in the opposite direction of the short blades 38b and 39b. The floating weight 31 forming a part of the upper part of the mixing chamber 33 is installed on a piston shaft 43, and vertically movably inserted in a hopper 44. The drop door 32 forming a part of the lower side of the mixing chamber 33 is designed to be opened and closed so that a mixed compound can be taken out of the mixing chamber. A numeral 45 refers to a charging port for charging a specific amount of materials to be charged plus the additives into the hopper 44.

Next, the operation of the internal mixer of the above-described constitution will be explained. A specific amount of materials, such as rubber, plastics, etc., and various additives, are charged into the hopper 44 from the charging port 45, and forced into the mixing chamber 33 by a push of the floating weight 31. Then, with the mixing chamber 33 closed, the driving power of the prime mover 40 is transmitted to the speed reducer 34 to turn the rotors 38 and 39 in opposite directions. In the mixing chamber 33, the materials to be mixed flow in the direction of the axis of the rotors 38 and 39 while being sheared at a tip clearance between the tips of the blades of the rotors 38 and 39 and the inner wall of the mixing chamber 33, thus performing so-called micro dispersion that the additives are dispersed into the materials to be mixed. Since the rotor 38 and the other rotor 39 rotate in opposite directions, the materials being mixed flow between the right and left mixing chambers. The materials being mixed, as shown at B in FIG. 4, gradually flow while swirling largely on the whole within the mixing chamber, with the additives being macro-dispersed for uniform mixing into the materials under mixing. When mixing in the mixing chamber 33 is finished, the drop door 32 located in the lower part of the mixing chamber 33 is opened to discharge the mixed compound out of the machine, thus completing one cycle of mixing operation.

The internal mixer comes in two types: one is the engaged type where two rotors are juxtaposed in an engaged condition, and the other is the non-engaged type where the two rotors are juxtaposed in a non-engaged condition and rotate at different speeds, for the purpose of improving the micro and macro dispersion functions by periodically changing the phases of the blades of she two rotors 38 and 39. However, if the two rotors 38 and 39 are rotated at different speeds, there takes place a difference in a mixing energy to be added to the materials to be mixed in the right and left mixing chambers, resulting in inactive flow of the materials between the right and left mixing chambers and accordingly in insufficient macro dispersion. In this case, the mixed compound will become of nonuniform quality. To cope with this sort of problem, there has been disclosed (refer to Japanese Patent Publication No. Hei 2-33871) an internal mixer with two rotors arranged in specific phases and driven at the same speed. According to this internal mixer, as the two rotors rotate at the same speed, there will occur no difference in the mixing energy to be added to the materials in the right and left mixing chambers, resulting in active flow of the materials between the right and left chambers and sufficient macro dispersion of the additives into one materials.

In the prior-art non-engaged type of internal mixer described above, when the two rotors are rotated at the same speed in an attempt to activate material flow between the right and left mixing chambers, an excellent mixing result is gained as compared with rotor operation at different speeds on an average. However, rotor operation at different speeds is in some cases relatively superior, depending on the materials to be mixed, in the respect of material flow characteristics and the speed of feed of the materials into the mixing chambers after a charge. It will become necessary to experimentally test the suitability of the same or different speeds of the two rotors to the mixing of materials. Therefore, the two rotors have to be driven at the same speed or at different speeds according to the materials to be mixed, and, inefficiently, gears of the speed reducer or the speed reducer itself must be changed every time the rotor speed is changed. It has been a practice to employ two types of mixers according to materials to be mixed: one with two rotors driven at the same speed and the other with two rotors driven at different speeds. However, it has been necessary to produce a mixed compound on small lots in order to produce several types of mixed compounds in small quantities. For this purpose, it is desired that there be adopted one mixer equipped with two rotors which can be driven both at the same speed and at different speeds according to a difference in the type of materials to be mixed. To meet this, it is supposed to use two sets of motors for a single mixer. In the mixer, two rotors of this mixer are connected to the output shaft of the speed reducer coupled with each of the two motors, so that the two rotors of the single mixer can be operated both at the same speed and at different speeds by changing the speed of one of the motors. In this case, the mixer has the following problem that the adoption of the two motors and two speed reducers will increase cost and moreover it is difficult to electrically exactly match up the speeds of the two motors, resulting in a phase shift.

SUMMARY OF THE INVENTION

In view of the above-described various problems inherent in the heretofore known techniques, it is an object of the present invention to provide an internal mixer of simple construction which is usable both at the same and different speeds of rotation of the two rotors.

To solve the above-described problems, the internal mixer of the present invention has two rotors, which are juxtaposed in a non-engaged condition and connected with two output shafts of speed reducer, within two communicating cylindrical closed spaces which are round in cross section. Driving power from a prime mover is transmitted to the speed reducer to turn the rotors in opposite directions. The speed of rotation of the two output shafts of the speed reducer is changeable between the same speed and different speeds.

Between the two output shafts of the speed reducer are disposed a set of gears having the same number of teeth and another set of gears having different numbers of teeth. The two output shafts of the speed reducer can be driven at the same or different speeds by transmitting a torque from one output shaft to the other output shaft by using either set of the gears.

The foregoing object and other objects, as well as the actual construction and operation of the internal mixer according to the present invention, will become more apparent and understandable from the following detailed description thereof, when read in connection with the accompanying drawings.

DESCRIPTION OF THE PREFERRED EMBODIMENT

Figure 1:
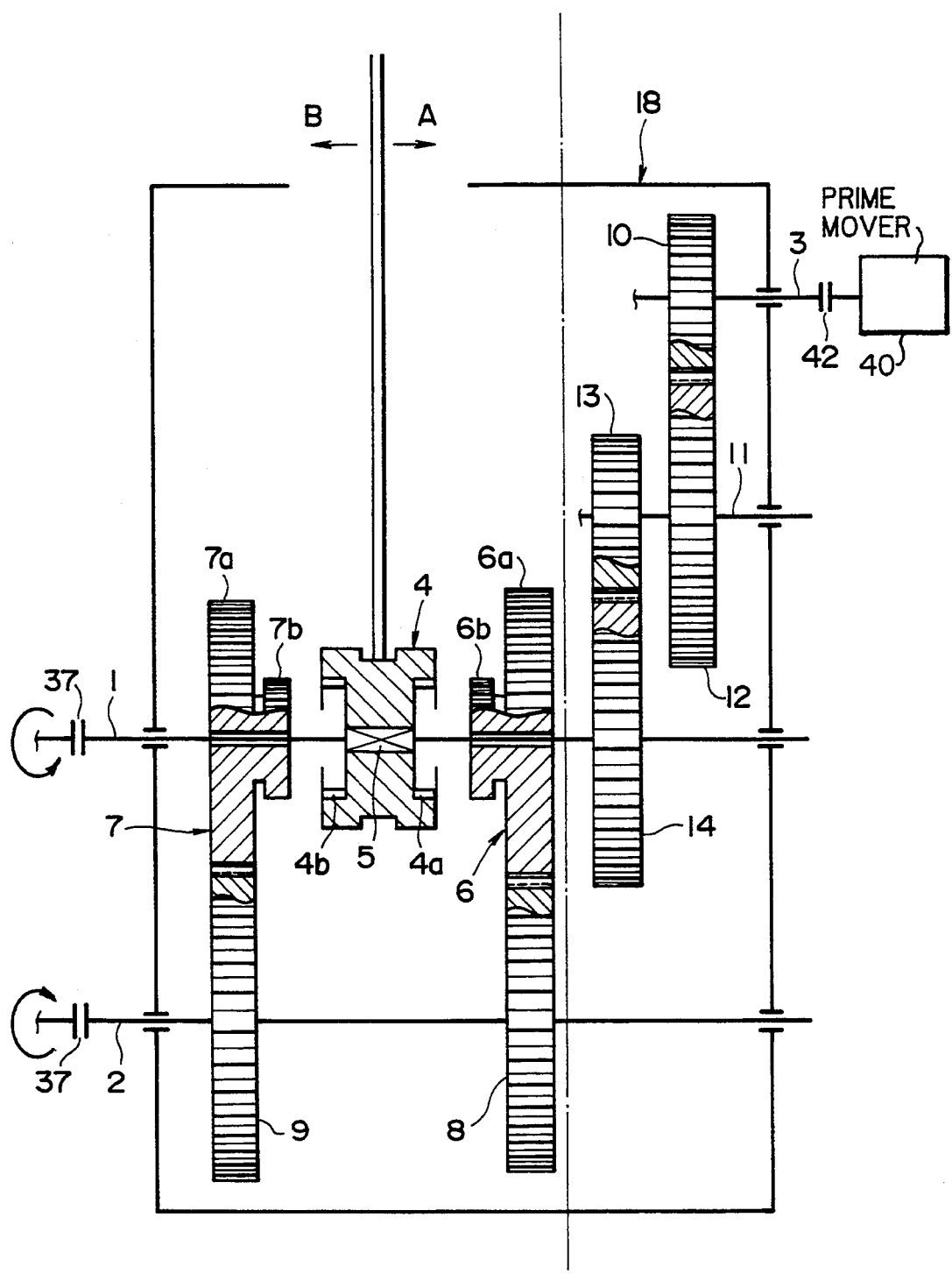
FIG. 1 is a drawing showing a speed reducer of an internal mixer according to the present invention.
Figure 3:
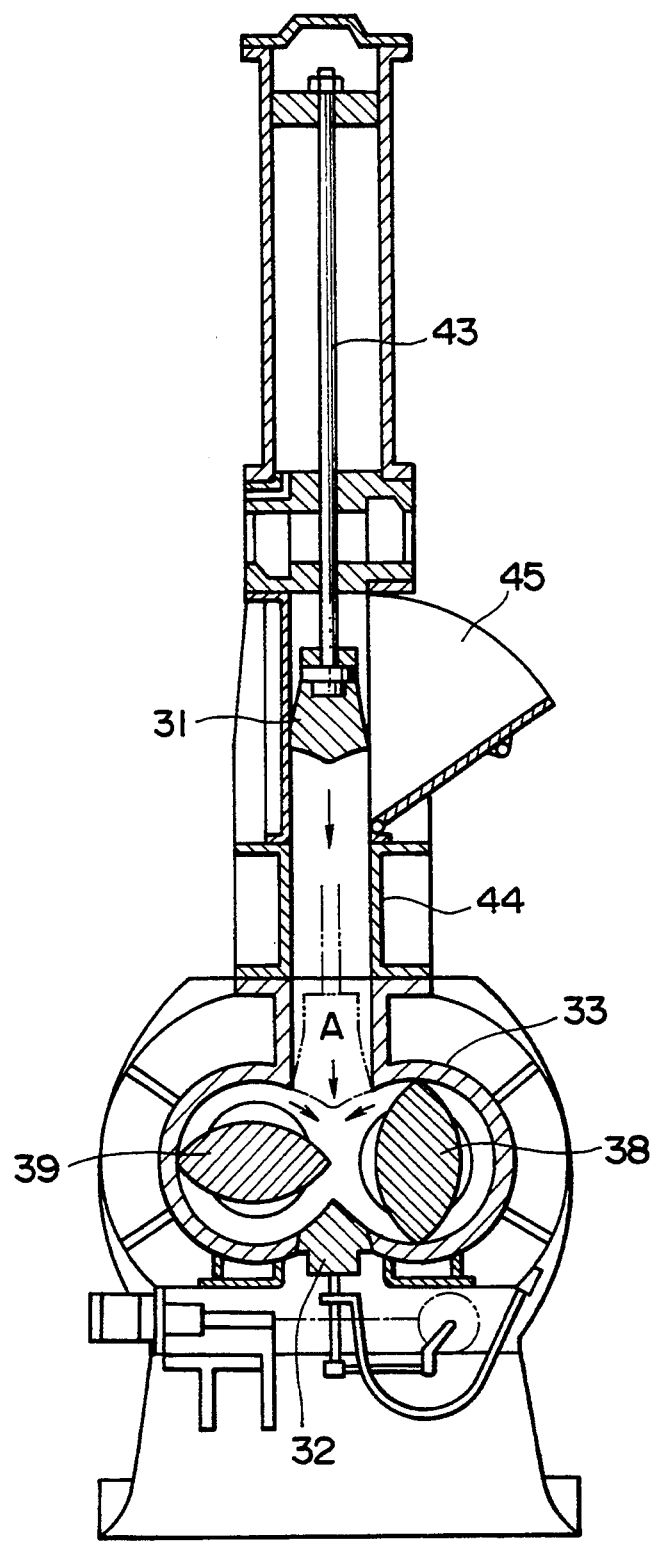
FIG. 3 is a sectional view of a conventional internal mixer.
Figure 4:
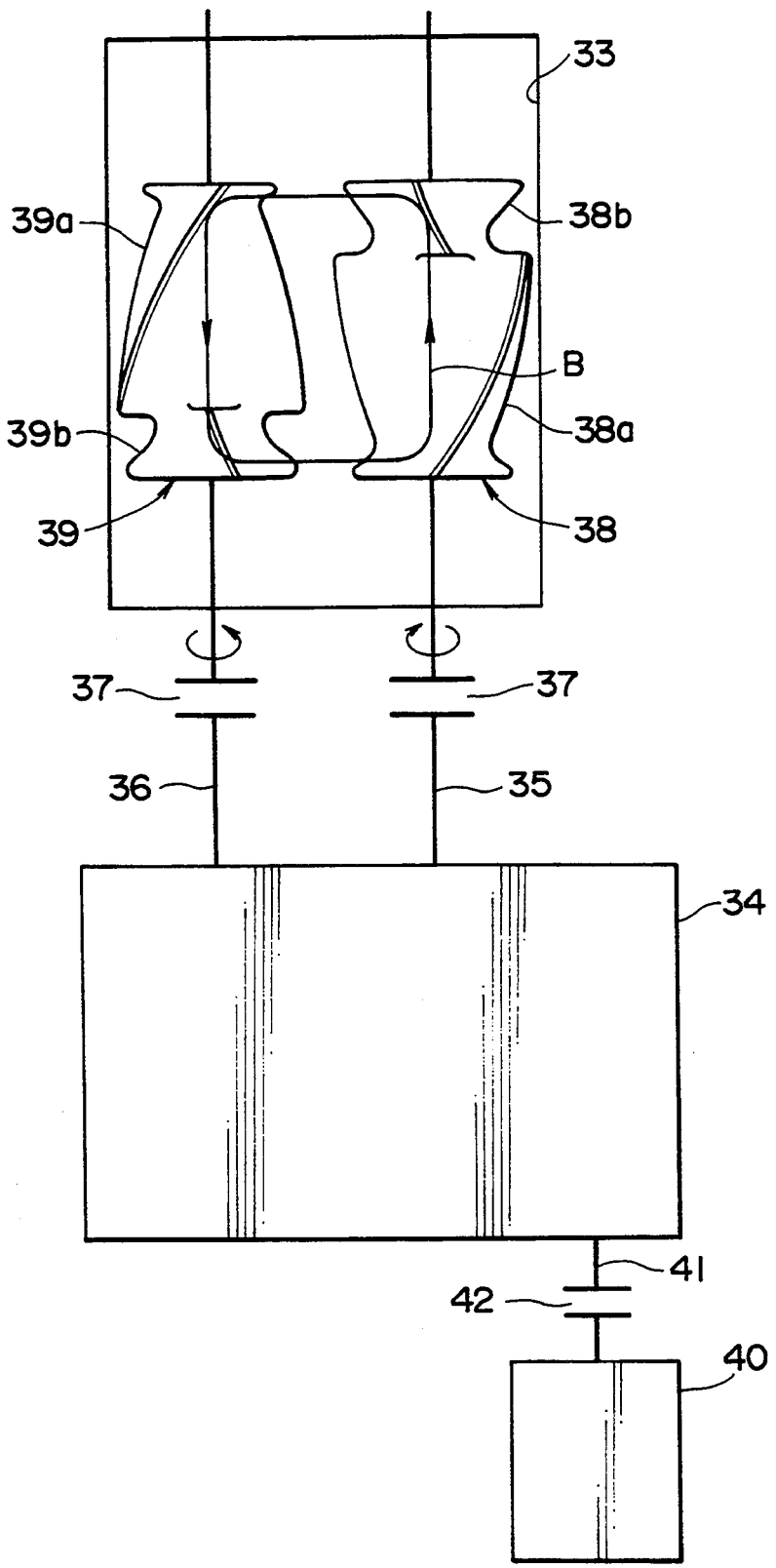
FIG. 4 is a view taken along the arrow A in FIG. 3.

Hereinafter a preferred embodiment of an internal mixer according to the present invention will be explained with reference to the accompanying drawings. FIG. 1 is a drawing showing a speed reducer of the internal mixer of the present invention. The overall constitution and operation of the internal mixer are similar to those explained in FIGS. 3 and 4. Hereinafter, therefore, the speed reducer of the internal mixer of the present invention will be described; the same members in FIG. 1 as those in FIGS. 3 and 4 are designated by the same reference numerals, and will not be explained.

In FIG. 1, a speed reducer 18 comprises output shafts 1 and 2 connecting the two rotors 38 and 39 through the coupling 37, an input shaft 3 connected to the prime mover 40 through the coupling 42, a slidable clutch 4 which slides along a sliding key 5 on the output shaft 1, stepped gears 6 and 7 idling on the output shaft 1, and gears 8 and 9 fixedly installed on the output shaft 2. The stepped gears 6 and 7 consist of gears 6a and 6b and the gears 7a and 7b respectively, either gears being formed in one body. The gear 6a and a gear 8 in mesh with the gear 6a have the same number of teeth and comprise second gearing. A gear 9 in mesh with the gear 7a has a different number of teeth from the gear 7a (the number of teeth of the gears 7a and 9 is determined in accordance with the speed ratio of the two rotors 38 and 39 required; here the gear ratio of the gears 7a and 9 is set at 1:1.15 in order to provide the two rotors 38 and 39 with the speed ratio of 1.15:1) and comprise third gearing. The clutch 4 has on both ends internal gears 4a and 4b which can come into mesh with the gears 6b and 7b. The clutch 4 is moved in the direction A or B to move the gears 4a and 4b into mesh with the gears 6b and 7b. Then the rotation of the output shaft 1 is transmitted to the output shaft 2 from the gears 6a and 7a through the gears 8 and 9. When the clutch 4 is in the neutral position as shown in FIG. 1, the rotation of the output shaft 1 is not transmitted to the output shaft 2, and therefore the output shaft 1 can turn by itself. The first gearing includes a gear 10 fixed on the input shaft 3; gears 12 and 13, on the shaft 11; and a gear 14, on the output shaft 1. These gears 10, 12, 13 and 14 come into engagement in order, transmitting the driving power of the prime mover to the output shaft while being reduced.

Next, the operation of the speed reducer described above will be explained with reference to FIG. 1. Where macro dispersion is made much of in mixing of materials, the clutch 4 is first placed in neutral so that only the output shaft 1 can turn by itself. Then the output shaft 1 is rotated by inching operation to make a control in order that a phase difference of the two rotors 38 and 39 will become a specific value, for example 0°. Subsequently the clutch 4 is moved in the direction A to move the gear 4a into mesh with the gear 6b. In this state, the driving power of the prime mover 40 is transmitted to the output shaft 1, the rotation of the output shaft 1 is transmitted to the gear 6a, and further to the output shaft 2 through the gear 8 which is in mesh with the gear 6a. At this time, since the gear 6a has the same number of teeth as the gear 8, the output shafts 1 and 2 turn at the same speed, and accordingly the two rotors 38 and 39 also turn at the same speed. In the meantime, when micro dispersion is important in the mixing of materials, the clutch 4 is moved in the direction B to engage the gear 4b with the gear 7b. In this state, as the driving power of the prime mover 40 is transmitted to the output shaft 1, the rotation of the output shaft 1 flows to the gear 7a, and further to the output shaft 2 through the gear 9 which is in mesh with the gear 7a. At this time, since the gear ratio of the gears 7a and 9 is 1:1.15, the speed ratio of the output shafts 1 and 2 is 1.15:1. The speed ratio of the two rotors 38 and 39, therefore, becomes 1.15:1 as desired. Between the two output shafts of this speed reducer are arranged set of gears having the same number of teeth and a set of gears having different numbers of teeth as previously stated. The rotation of one output shaft is transmitted to the other output shaft by using either one of these sets of gears, thereby enabling the two output shafts of the speed reducer to turn either at the same speed or at different speeds. In addition, this speed reducer is of such a simple construction that two sets of gears are arranged between the two output shafts. Therefore, the speed reducer allows the use of a single internal mixer having two rotors, which rotate at different speeds as well as at the same speed. This type of internal mixer is adaptable to the mixing of any kind of material without raising a cost.

Figure 2:
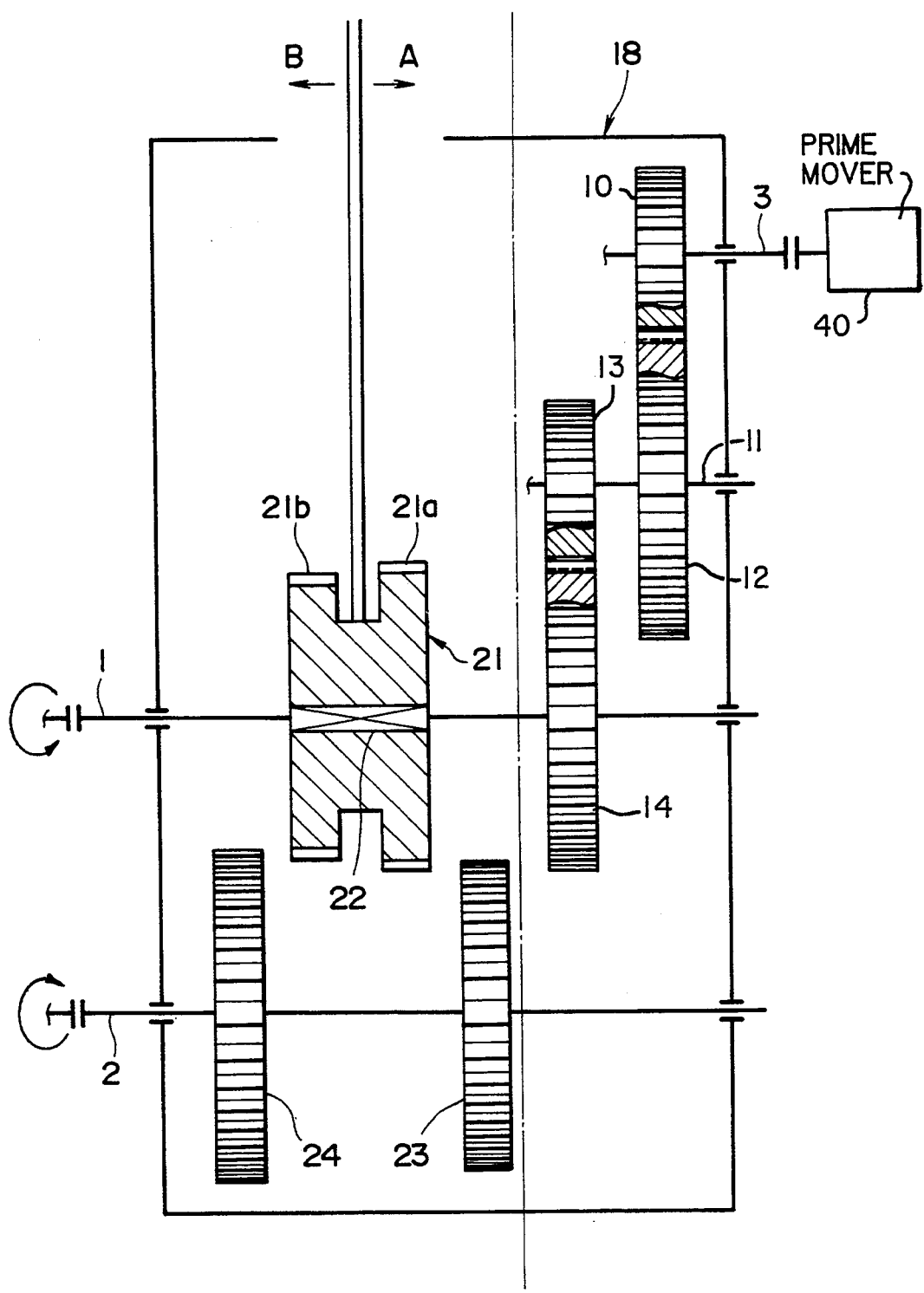
FIG. 2 is a drawing showing another speed reducer.

In the present embodiment, the clutch 4 having the internal gears 4a and 4b at both ends was explained. It is also possible to use a stepped gear 21 integrally consisting of two gears 21a and 21b as shown in FIG. 2. This stepped gear 21 is designed to slide along a sliding key on the output shaft 1. The gear 21a and the gear 23 (second gearing) which can come in mesh with this gear 21a have the same number of teeth, while the gear 21b and the gear 24 (third gearing) which can come in mesh with this gear 21b have different numbers of teeth. In this case, also, it is possible to transmit the rotation of the output shaft 1 to the output shaft 2 by moving the stepped gear 21 in the direction A or B so that the gears 21a and 21b will come into mesh with the gears 23 and 24. Furthermore, when the stepped gear 21 is in the neutral position as shown in FIG. 2, the rotation of the output shaft 1 is not transmitted to the output shaft 2, and therefore the output shaft 1 can rotate by itself, gaining a similar effect as in the embodiment described above. The internal mixer comes in two types: a so-called unidrive type which transmits the driving power of the prime mover to two rotors by the use of a speed reducer having both a speed reducing function and a two-shaft driving function, and so-called compact drive type which transmits the driving power of the prime mover to two rotors by use of a speed reducer which functions only for reducing speeds and a timing gear for two-shaft driving. In the above-described embodiment, the speed reducer in the unidrive type internal mixer has been explained, but it should be noted that it is possible to similarly apply the present invention to the compact drive type by coupling the output shaft 1 of the speed reducer 18 (the part on the left of an alternate long and short dash line in FIGS. 1 and 2), through a coupling, to the output shaft of the speed reducer for speed reduction purpose alone.

In the internal mixer of the present invention, there are arranged a set of gears having the same number of teeth and another set of gears having different numbers of teeth between the two output shafts of the speed reducer. The two output shafts of the speed reducer can be turned at the same or different speeds by transmitting the rotation from one output shaft to the other output shaft by the use of either set of gears. Moreover, this speed reducer is of such a simple construction that two sets of gears are disposed between the two output shafts. Therefore, using this speed reducer can operate the two rotors of a single internal mixer at the same speed or at different speed, thus mixing any kind of material without increasing a production cost.

The present invention has been described in detail with particular reference to a preferred embodiment thereof but it will be understood that variations and modifications can be effected within the spirit and scope of the invention.

What is claimed is:

1. An internal mixer comprising:
chamber means for defining two communicating cylindrical closed spaces;
two non-engaged rotors having blades and respectively mounted in said spaces, said rotors being mutually positioned such that materials to be mixed in said chamber means are sheared between tips of said blades when said rotors are rotated in opposite directions; and
a speed reducer including an input shaft, output shafts rotating in said opposite directions and respectively mounting said rotors, and a gearing system including gears mounted on said output shafts and having an equal number of teeth and also including gears mounted on said output shafts and having a different number teeth, said gearing system connecting said input shaft with said output shafts, said gearing system further comprising means for alternately driving said output shafts in said opposite directions at mutually different speeds and in said opposite directions at the same speed.

2. An internal mixer comprising:
chamber means for defining two communicating cylindrical closed spaces;
two non-engaged rotors respectively mounted in said spaces; and
a speed reducer including an input shaft, output shafts rotating in opposite directions and respectively mounting said rotors, and a gearing system connecting said input shaft with said output shafts, said gearing system further comprising means for alternately driving said output shafts in said opposite directions at mutually different speeds and in said opposite directions at the same speed,
wherein said gearing system comprises:
first gearing driven by said input shaft and directly driving one of said output shafts,
second gearing including meshing gears having an equal number of teeth, said meshing gears including a gear mounted to another of said output shafts and driving said another of said output shafts,
third gearing including meshing gears having a different number of teeth, said meshing gears including a gear mounted to said another of said output shafts and driving said another of said output shafts, and
a clutch non-rotatably mounted on said one of said output shafts and movable for selectively drivingly connecting said one of said output shafts with one of said second gearing and said third gearing.

3. An internal mixer comprising:
chamber means for defining two communicating cylindrical closed spaces;
two non-engaged rotors respectively mounted in said spaces; and
a speed reducer including an input shaft, output shafts rotating in opposite directions and respectively mounting said rotors, and a gearing system connecting said input shaft with said output shafts, said gearing system further comprising means for alternately driving said output shafts in said opposite directions at mutually different speeds and in said opposite directions at the same speed,
wherein said gearing system comprises:
first gearing driven by said input shaft and directly driving one of said output shafts,
two gears mounted on another of said output shafts for driving said another of said output shafts, and having different numbers of teeth, and
a stepped gear movably and non-rotatably mounted on said one of said output shafts and having a gear portion engageable with said one of said gears mounted on said another of said output shafts for driving said one of said gears and having the same number of teeth as said one of said gears, said stepped gear also having another gear portion engageable with the other of said gears mounted on said another of said output shafts for driving said another of said gears and having a different number of teeth than said another of said gears.

* * * * *